United States Patent
Dong et al.

(10) Patent No.: US 9,102,535 B2
(45) Date of Patent: Aug. 11, 2015

(54) FLAMELESS STEAM REFORMER

(75) Inventors: Sang Keun Dong, Daejeon (KR); Je Bok Yang, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 896 days.

(21) Appl. No.: 13/337,837

(22) Filed: Dec. 27, 2011

(65) Prior Publication Data
US 2013/0164179 A1 Jun. 27, 2013

(51) Int. Cl.
*B01J 7/00* (2006.01)
*C01B 3/38* (2006.01)
*B01J 8/04* (2006.01)

(52) U.S. Cl.
CPC ............... *C01B 3/384* (2013.01); *B01J 8/0465* (2013.01); *B01J 8/0496* (2013.01); *B01J 2208/0053* (2013.01); *B01J 2208/00495* (2013.01); *B01J 2208/00849* (2013.01); *B01J 2208/00884* (2013.01); *C01B 2203/0233* (2013.01); *C01B 2203/0811* (2013.01); *C01B 2203/1241* (2013.01)

(58) Field of Classification Search
CPC ............... B01J 2523/00; B01J 2523/24; B01J 2523/3706; B01J 2523/3725; B01J 2523/72; B01J 2219/00006; B01J 2523/11; B01J 2523/22; B01J 2523/305; B01J 2208/00309; B01J 8/009; B01J 8/065; B01J 2523/12; B01J 21/04; B01J 2208/00504; B01J 2208/0053; B01J 23/10; B01J 23/63; B01J 23/755; B01J 2523/54; B01J 2523/845; B01J 35/002; B01J 37/18; B01J 8/0278; B01J 8/0285; B01J 19/242; B01J 19/2425; C01B 2203/0883; C01B 2203/0894; C01B 2203/1017; C01B 2203/1052; C01B 2203/148; C01B 2203/1604; C01B 2203/82; C01B 31/0226; C01B 31/04; C01B 3/32; C01B 3/40; C01B 3/44; C01B 2202/06
See application file for complete search history.

(56) References Cited

U.S. PATENT DOCUMENTS

| 7,842,109 B2 * | 11/2010 | Kong et al. ........................ 48/89 |
| 8,003,269 B2 * | 8/2011 | Lee et al. ........................ 429/423 |
| 8,017,088 B2 * | 9/2011 | Lee et al. ........................ 422/625 |
| 2007/0020161 A1 * | 1/2007 | Cho et al. ........................ 422/191 |
| 2010/0158769 A1 * | 6/2010 | Lee et al. ........................ 422/191 |

FOREIGN PATENT DOCUMENTS

| JP | 2001-304495 A | 10/2001 |
| JP | 2004-155629 A | 6/2004 |

(Continued)

OTHER PUBLICATIONS

KIPO Notice of Allowance for Korean Patent Application No. 10-2010-0114606 which corresponds to the above-identified U.S. application.

(Continued)

*Primary Examiner* — Kaity Handal
(74) *Attorney, Agent, or Firm* — LRK Patent Law Firm

(57) ABSTRACT

A flameless steam reformer is provided, which includes a main housing, a catalyst housing which is inserted to the main housing and in which a combustion catalyst and a reforming catalyst are provided such that they are partitioned from each other, and a passage housing which is disposed between the main housing and the catalyst housing and includes a passage through which a reforming fuel supplied to the catalyst housing moves.

29 Claims, 11 Drawing Sheets

(56) References Cited

FOREIGN PATENT DOCUMENTS

| | | |
|---|---|---|
| JP | 2007-524562 A | 8/2007 |
| KR | 10-2006-0001535 A | 1/2006 |
| KR | 10-2010-0114606 | 11/2010 |

OTHER PUBLICATIONS

KIPO Office Action for Korean Patent Application No. 10-2010-0114606 which corresponds to the above-identified U.S. application.

* cited by examiner

FLAMELESS STEAM REFORMER

BACKGROUND OF THE INVENTION

1. Field of the Invention

The present invention relates to a flameless stream reformer.

2. Description of the Prior Art

Generally, a reformer refers to a device that produces hydrogen from fossil fuels or hydrocarbon fuels for use in a fuel cell.

The reformer uses fuel reforming technology to produce hydrogen from fuels such as methane, gasoline or methanol and has been frequently used in petrochemical processes such as ammonia synthesis processes. However, it is difficult to apply to direct fuel cells, because of limitations caused by the characteristics of the fuel cells.

Fuel cells for large-scale power generation are operated at a relatively fixed output level and have a short shutdown time, and thus can use natural gas reformers which have been used in existing chemical factories. However, the reformer needs to be miniaturized depending on the output of the fuel cell.

Fuel cells for home use have small capacity and are operated at various output levels.

It is known that solid oxide fuel cells are operated at a high temperature of 600~1000° C. and a hydrocarbon fuel injected directly into the fuel electrode of the fuel cell can be internally reformed into $H_2$ (fuel for the fuel cell) and CO.

However, for this purpose, a reforming catalyst needs to be provided in the fuel cell stack. Also, when the reforming catalyst is inactivated, the body of the fuel cell should be replaced.

Particularly, in internal reforming, carbon deposition is highly likely to occur throughout the anode (for hydrocarbons having many carbon atoms, the possibility of carbon deposition is high), and in this case, the inactivation of the reforming catalyst can rapidly occur.

When a steam reforming reaction occurs rapidly, a severe drop in temperature can locally occur to deteriorate the performance of the fuel cell and cause severe thermal stress in the fuel cell structure, thus shortening the life expectancy of the fuel cell.

Due to the above-described problems, studies on the use of external reformers in the operation of solid oxide fuel cells (SOFCs) are being actively conducted.

Current methods of reforming hydrocarbon fuels to produce hydrogen can be classified into decomposition, steam reforming, partial oxidation, and autothermal reforming.

The decomposition reaction of hydrocarbons is a reaction in which hydrocarbons are decomposed into hydrogen and carbon by heating in a state in which water or oxygen is not introduced. This decomposition reaction has an advantage in that pure hydrogen can be obtained using a relatively simple process.

However, when a complex hydrocarbon is decomposed, there are shortcomings in that reaction by-products in addition to carbon and hydrogen are produced and carbon is continuously deposited in the reactor to reduce the activity of the catalyst and block the gas passage in the reformer.

For this reason, as reforming methods that are to be applied to a general SOFC fuel cell system, steam reforming, partial oxidation reforming and autothermal reforming have been considered.

In the steam reforming method in which fuel and steam are allowed to react with each other, oxygen for converting carbon in a hydrocarbon into carbon monoxide is supplied from water to the hydrocarbon, while a reaction for obtaining hydrogen from water occurs. The basic reactions for the steam reforming method are expressed in the following reaction schemes (1-1) and (1-2):

(1-1) (1-2)

Thus, it is known that the steam reforming reaction produces hydrogen in an amount larger than the amount of hydrogen contained in a hydrocarbon, and thus has high hydrogen production efficiency.

However, this steam reforming reaction has a problem in that it is an intense endothermic reaction in which a portion of fuel should be burned to supply heat for the reaction such that the high hydrogen production efficiency of the reaction can be partially offset.

In addition, it is known that, because the reactor for steam reforming should additionally be provided with a burner or the like, it is large and complex, and thus is frequently applied to processes for large-scale hydrogen production. Also, the reactor is unsuitable for use as a small-scale reformer due to its long starting time.

Meanwhile, the partial oxidation reforming reaction is a reaction in which carbon in a hydrocarbon is converted into carbon monoxide using either pure oxygen or oxygen contained in air. It is divided into a catalytic partial oxidation reaction using a catalyst and a non-catalytic partial oxidation reaction.

The non-catalytic partial oxidation reaction progresses at a high temperature of 1150~1400° C., whereas the catalytic partial oxidation reaction progresses at a relatively low temperature of 700~850° C., and thus does not need to use a reactor made of an expensive material.

The partial oxidation reforming reaction is a very fast and weakly exothermic reaction in which heat for the reaction does not need to be supplied from the outside. Thus, the reactor for the reaction is small in size and has significantly excellent starting characteristics.

Unlike the steam reforming method, the partial oxidation reforming reaction is an exothermic reaction that starts fast. Also, it has high response characteristics even when the amount of hydrogen supplied is changed according to a change in the load of the fuel cell.

However, the partial oxidation reforming reaction requires high temperature, and the purity of hydrogen obtained thereby is low, indicating that it has energy efficiency lower than the steam reforming reaction.

Meanwhile, the autothermal reforming is a method in which the steam reforming reaction that is endothermic and the partial oxidation reaction that is exothermic occur at the same time in the presence of the same catalyst such that the reaction heat becomes zero.

For example, when each of the reactions uses methane as a raw material, the steam reforming reaction is strongly endothermic, and the partial oxidation reaction is weakly exothermic. Thus, in order for the sum of the reactions to become thermally neutral, the ratio of the steam reforming reaction to the partial oxidation reforming reaction should become 1:5.7.

The nature of the autothermal reforming reaction does not significantly differ from that of the partial oxidation reforming reaction. Thus, when the extent of the steam reforming reaction in the autothermal reforming reaction is increased, heat for the reaction should be supplied from the outside, and thus the reactor becomes more complex and larger and the operation of the reaction is difficult to control. For this reason, the autothermal reforming reaction is mainly used in small-scale systems.

Heat transfer to a reforming catalytic layer occurs mainly by the burner flame, and heat transfer from the burner flame is required to preheat fuel or steam. Thus, controlling the burner flame to a suitable shape and size is required and an igniter is also required.

The burner flame is essential in terms of the structure of a reformer, but the burner flame can cause the problem of oxidizing the combustion chamber wall depending on operating conditions.

A reformer according to the prior art will now be described with reference to FIG. 1.

Referring to FIG. 1, below a reformer 10 according to the prior art, a burner 11 is disposed. A flame supplied from the burner 11 to the reformer 10 moves directly toward the inner wall of the combustion chamber of the burner while it can damage the inner wall of the combustion chamber.

For this reason, hot spots can easily occur on the inner wall of the combustion chamber while they can deteriorate the durability of the combustion chamber.

Also, a reforming catalyst 12 provided in the reformer 10 needs to be easily replaced due to its limited life expectancy. However, the reformer 10 according to the prior art has a problem in that it is difficult to replace the reforming catalyst 12.

Another reformer according to the prior art will now be described with reference to FIG. 2.

Referring to FIG. 2, a burner 11 is disposed below a reformer 20. A flame generated from the burner 11 heats the lower outer portion of the reformer 20 so as to heat a reforming catalyst 12.

The flame from the burner is concentrated on a specific portion of the reformer 20 while it deteriorates the durability of the reformer 20. Thus, there is a need to solve this problem.

SUMMARY OF THE INVENTION

Accordingly, the present invention has been made in view of the problems occurring in the prior art, and it is an object of the present invention to provide a nameless steam reformer having high efficiency and fast starting properties, in which the structure of a combustion chamber is modified to provide a reforming reactor in which no flame occurs.

Another object of the present invention is to provide a flameless steam reformer in which heat loss is reduced to increase heat efficiency.

To achieve the above objects, in one aspect, the present invention provides a flameless steam reformer including: a main housing; a catalyst housing which is inserted to the main housing and in which a combustion catalyst and a reforming catalyst are provided such that they are partitioned from each other; and a passage housing which is disposed between the main housing and the catalyst housing and includes a passage through which combustion fuel supplied to the catalyst housing moves.

The catalyst housing may include: a reforming catalyst housing including the reforming catalyst; and a combustion catalyst housing in which the reforming catalyst housing is inserted and the combustion catalyst is included.

The combustion catalyst may be provided ahead the reforming catalyst housing.

The combustion catalyst may be provided ahead and around the reforming catalyst housing.

The reforming catalyst housing may include an inner housing in which the reforming catalyst is received.

The inner housing may be disposed along the lengthwise direction of the reforming catalyst housing so as to be spaced inward from both ends of the reforming catalyst housing.

The reforming catalyst housing may include a stopper for fixing the position of the inner housing.

A reformed gas pipe through which the reformed gas moves may be provided in the center of the inside of the reforming catalyst housing.

The reforming catalyst housing may include at least one chamber disposed along the lengthwise direction thereof.

The chamber may include first and second chambers in the front end thereof.

The chamber may include third and fourth chambers in the rear end thereof.

A first porous plate dividing the inner region of the chamber and having a plurality of holes may be disposed between the first and second chambers.

A second porous plate dividing the inner region of the chamber and having a plurality of holes may be disposed between the third and fourth chambers.

The second chamber may be larger than the first chamber.

The fourth chamber may be larger than the third chamber.

The reformed gas pipe may be inserted in the center of the first porous plate.

The first and second porous plates may have a plurality of holes which have the same diameter and spaced apart from each other at constant intervals.

The end of the reforming catalyst housing may be rounded outward toward the passage housing.

The catalyst housing may include a catalyst housing cover in which pipes for moving the reformed gas, the reforming air and the combustion gas may be inserted.

The catalyst housing cover may include a protrusion toward the catalyst housing, in which the catalyst housing may include a groove in which the protrusion is inserted.

The first porous plate may be disposed at the central portion of the catalyst housing cover.

The combustion catalyst housing may include a receiving portion in which the combustion catalyst is filled.

The reforming catalyst housing may include a third porous plate which is provided on the outside thereof and has holes through which the combustion gas from the combustion catalyst housing may move.

The inner region of the combustion catalyst housing may be divided, with respect to the third porous plate, into two.

The combustion catalyst housing may include a fifth chamber in which the combustion gas passed through the third porous plate diffuses and from which heat is transferred to the reforming catalyst housing.

The combustion catalyst housing may include holes through which the combustion gas passed through the third porous plate moves.

The main housing may include a main housing cover for covering the main housing and the passage housing.

The main housing may include an auxiliary housing cover provided on the outside thereof.

The main housing may include a heat-insulating layer.

The passage may be provided along the circumferential direction of the passage housing.

In another aspect, the present invention provides a flameless steam reformer including: a main housing; a catalyst housing which is inserted in the main housing and in which a reforming catalyst and a combustion catalyst are provided so as to be divided from each other; chambers which are provided in the catalyst housing and in which the combustion gas passed through the combustion catalyst diffuses and is heat-exchanged with the reforming catalyst; and a passage housing which is disposed between the main housing and the catalyst housing and includes a passage through which combustion fuel supplied to the catalyst housing moves.

The chambers may be disposed at both sides of the inside of the catalyst housing.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION OF THE INVENTION

Hereinafter, a flameless steam reformer according to one embodiment of the present invention will be described with reference to FIG. 3.

Figure 1:
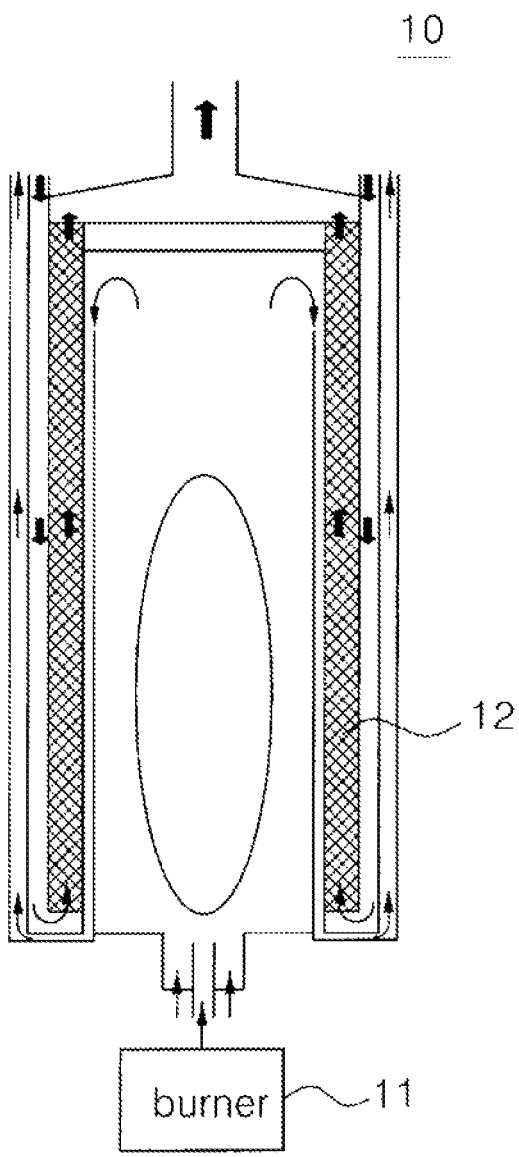
FIGS. 1 and 2 show reformers according to the prior art.
Figure 2:
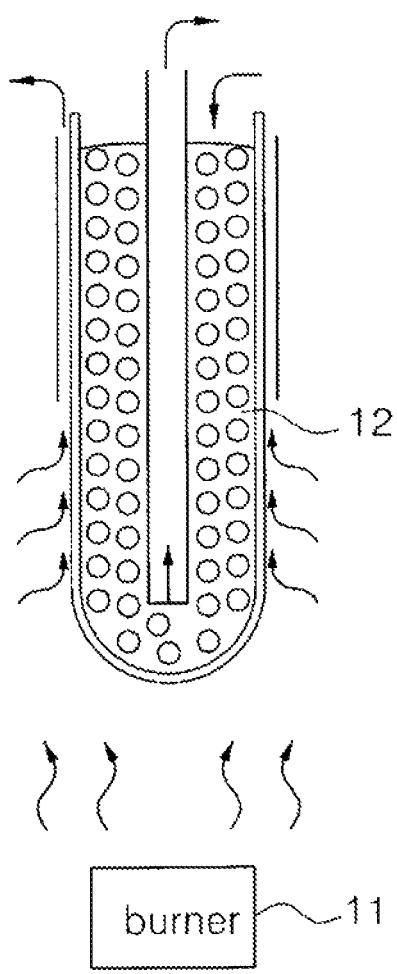
Figure 3:
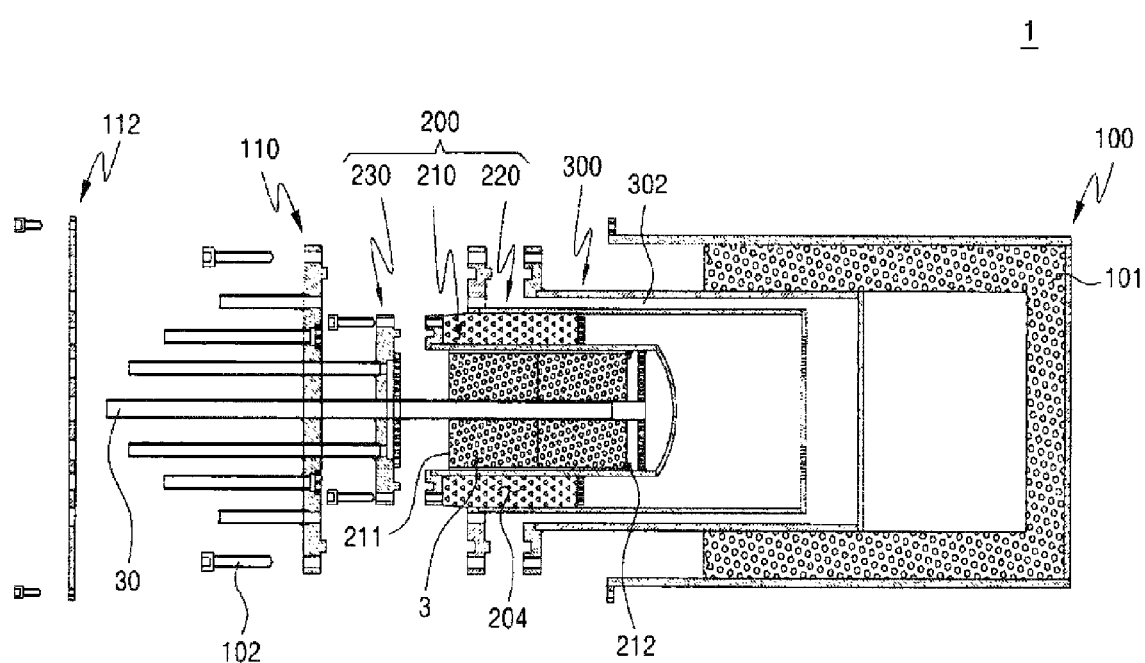
FIG. 3 is an exploded perspective view showing a flameless steam reformer according to the present invention.

Referring to FIG. 3, a steam reformer 1 according to the present invention can produce the reformed gas hydrogen using a stream reforming method and supply the reformed gas by a flameless method without using a separate burner.

The flameless steam reformer 1 may comprise a main housing 100 which has a given size and is cylindrical in shape.

The main housing 100 may include a heat-insulating layer 101.

The main housing 100 may further include a catalyst housing 200.

The catalyst housing 200 may have such a diameter that it can be disposed in the main housing 100.

The catalyst housing 200 may further comprise a reforming catalyst housing 210 having a reforming catalyst 3 therein.

Also, the catalyst housing 200 may further comprise a combustion catalyst housing 220 in which the reforming catalyst housing 210 is inserted and a combustion catalyst 2 is provided.

The detailed description of the reforming catalyst housing 210 and the combustion catalyst housing 220 will be described later.

The flameless steam reformer 1 may further comprise a passage housing 300 which is disposed between the main housing 100 and the catalyst housing 200 and has a passage 302 through which combustion fuel supplied to the catalyst housing 200 moves.

The flameless steam reformer 1 may further comprise a catalyst housing cover 230 for covering the catalyst housing 200.

Also, the main housing 100 may further comprise a main housing cover 110 for covering the catalyst housing 200 and the passage housing 300.

The main housing cover 110 may have inserted therein a plurality of pipes through which a reformed gas, a reforming air and a combustion fuel move.

The detailed description of the catalyst housing cover 230 and the main housing cover 110 will be described later.

The flameless steam reformer 1 may further an auxiliary housing cover 112 which is spaced apart from the main housing cover 110 and in which the pipes are inserted.

Also, the flame steam reformer 1 may further comprise a bolt 102 which is coupled to the main housing cover 110 to fix the catalyst housing 200.

Figure 4:
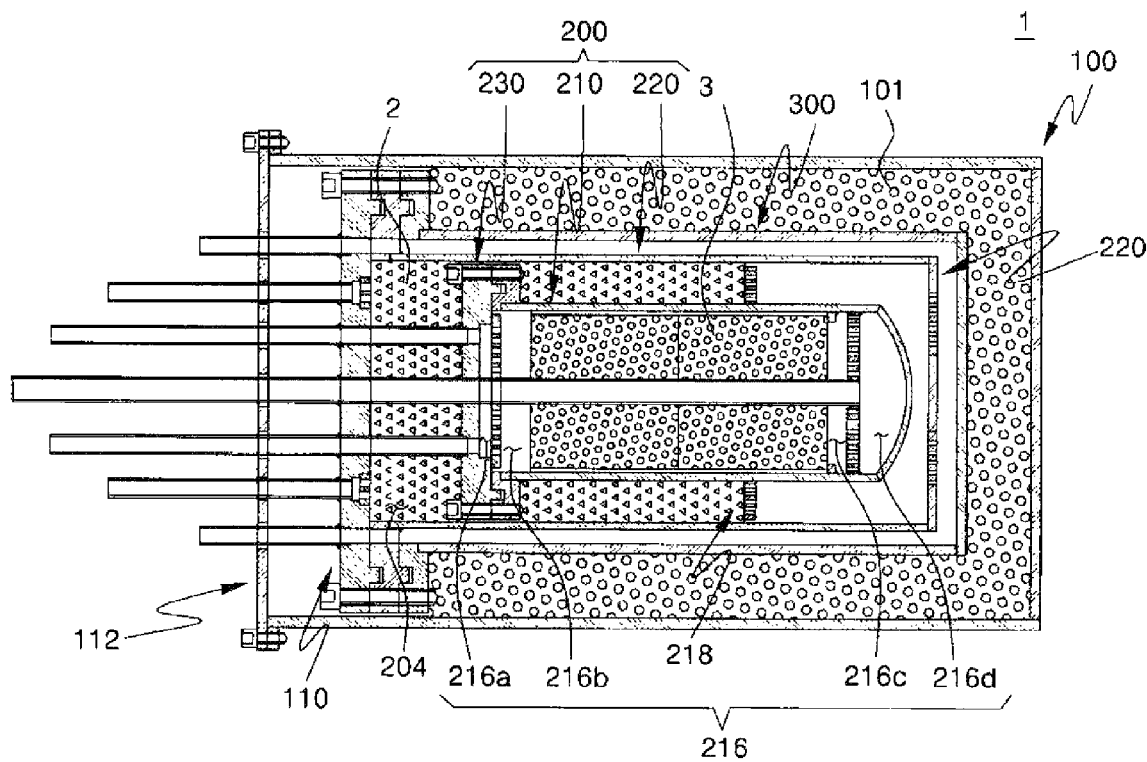
FIG. 4 is a cross-sectional view of a flameless steam reformer according to the present invention.
Figure 5:
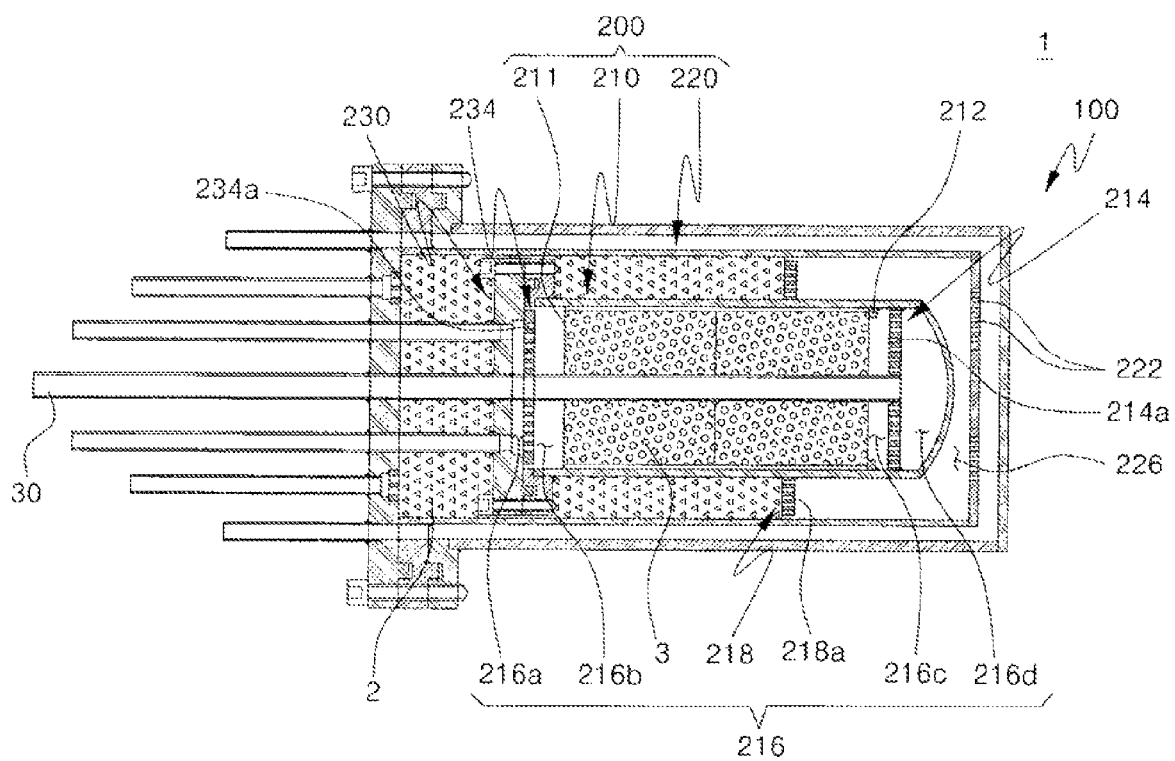
FIGS. 5 and 6 are cross-sectional views of a reforming catalyst housing provided in a flameless steam reformer according to the present invention.

The catalyst housing provided in the inventive flameless steam reformer configured as described above will now be described with reference to FIGS. 4 and 5.

To the catalyst housing 200, a reforming air and a combustion fuel may be supplied at the same time.

The reforming air may consist of a mixture of methane and water, and the flameless steam reformer 1 may be configured such that it generates hydrogen during the phase change of water to steam.

The combustion fuel may consist of a mixture of methane and air.

The catalyst housing 200 may include a combustion catalyst 2 and a reforming catalyst 3.

The combustion catalyst 2 allows a mixture of methane and air, which is supplied as the combustion fuel, to be heated to a given temperature.

The combustion catalyst 2 may react with the combustion fuel to cause a combustion reaction.

In the catalyst housing 200, the combustion catalyst 2 may be provided ahead the reforming catalyst 3.

When the combustion catalyst is provide as such, the combustion fuel passed through the combustion catalyst 2 is subjected to a combustion reaction at a relatively low temperature (350° C.), and thus in the present invention in which no burner is used, the durability of the catalyst housing 200 including the combustion catalyst 2 is improved and the combustion fuel and the reforming air are preheated at the same time.

For this reason, in the catalyst housing 200, hot spots do not occur, and the deformation of the catalyst housing 200 during use can be minimized.

The combustion catalyst 2 may be provided ahead and around the reforming catalyst housing 210.

When the combustion catalyst 2 is provided as such, the durability of the catalyst housing 200 is improved and heat transfer to the reforming catalyst 3 is improved, whereby the reforming reaction by the reforming catalyst 3 is generally improved.

Figure 6:
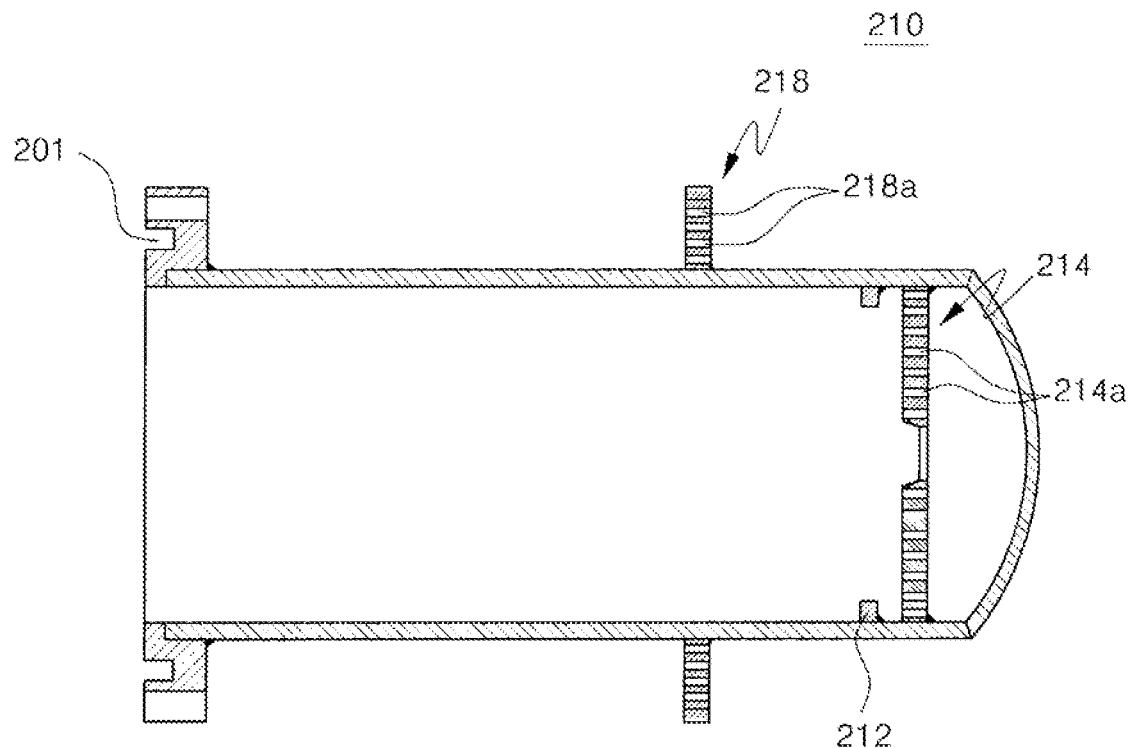

The reforming catalyst housing provided in the catalyst housing will now be described with reference to FIGS. 5 and 6.

The reforming catalyst housing 210 may include an inner housing 211 receiving the reforming catalyst 3.

The inner housing 211 may have such a shape that it can be inserted into the reforming catalyst housing 210. Because the reforming catalyst housing 210 has a cylindrical shape, the inner housing 211 may also have a cylindrical shape.

The inner housing 211 may further include a central hole into which a reformed gas pipe 30 to be described later is inserted.

The reforming catalyst housing 210 may further comprise stoppers 212 (shown on the right side of the figure) serving to fix the position of the inner housing 211.

The stoppers 212 may be arranged along the inner circumference of the reforming catalyst housing 210.

The reforming catalyst housing 210 may further include chambers 216 provided in the front and rear of the inner housing 211.

The chambers 216 may include first and second chambers 216a and 216b provided in the front of the inner housing 211, and third and fourth chambers 216c and 216d provided in the rear of the inner housing 211.

The second chamber 216b may have a larger area than the first chamber 216a.

This is because the second chamber 216b should provide a space through which the reformed gas stably moves through the reformed gas pipe 30 while the reformed gas should be heat-exchanged with the combustion catalyst housing 220.

In addition, before the reforming air moves to the reforming catalyst 3, it is heated to a given temperature by heat energy generated in the combustion catalyst 2.

In the first and second chambers 216a and 216b, after the reforming air is introduced into the chambers, it moves slowly by diffusion while it is continuously heat-exchanged with heat energy generated in the combustion catalyst 2.

Between the first chamber 216a and the second chamber 216b, a first porous plate 234 may be disposed, and between the third chamber 216c and the fourth chamber 216d, a second porous plate 214 may be disposed.

The first porous plate 234 serves to prevent the reforming air passed through the first chamber 216a from moving rapidly to the reforming catalyst 3.

This is because a reaction of the reforming air with the reforming catalyst 3 after heating of the reforming air to a given temperature is more advantageous in terms of heat exchange than a reaction of the reforming air with the reforming catalyst 3 before heating of the reforming air to a given temperature.

In the reforming catalyst housing 210, the second porous plate 214 may provided spaced apart from the stopper 212 such that it divides the region of the reforming catalyst housing 210 into two.

The second porous plate 214 may be disc-shaped and may have a plurality of holes 214a which are spaced from each other at constant intervals.

The size, number and interval of the holes 214a are not specifically limited.

Also, a hole into which a reformed gas pipe 30 is inserted may be formed in the center of the second porous plate 214.

The third chamber 216c may be provided between the inner housing 211 and the second porous plate 214.

The third chamber 216c serves to cause the diffusion of the reforming air passed through the reforming catalyst 3. In the third chamber 216c, the movement speed of the reforming air become slower while the reforming air can be heat-exchanged with the combustion catalyst housing 220.

The fourth chamber 216d may be provided between the second porous plate 214 and the inner end of the reforming catalyst housing 210.

The fourth chamber 216d may have a larger area than the third chamber 216c.

This is because the fourth chamber 216d should provide a space through the reformed gas can stably move through the reformed gas pipe 30 while the reformed gas should be heat-exchanged with the combustion catalyst housing 220.

The second porous plate 214 serves to prevent the reformed gas passed through the third chamber 216c from moving rapidly to the fourth chamber 216d and the reformed gas pipe 30.

This is because, when the reformed gas supplied to the reformed gas pipe 30 is supplied to a fuel cell (not shown) after heating to a suitable temperature, the reactivity thereof with oxygen contained in air is increased.

By doing so, the reactivity of the reformed gas with oxygen in a plurality of cells provided in a fuel cell stack is increased, and thus the generation of electricity in the stack becomes stable and uniform.

The holes 214a serve to reduce the movement speed of the reformed gas to prevent the reformed gas from moving rapidly to the reformed gas pipe 30, and these holes 214a allow the reformed gas to move uniformly to the fourth chamber 216d.

The holes 214a may be directed in the same direction as the movement direction of the reformed gas.

The reforming catalyst housing 210 may be configured such that the end in which the fourth chamber 216d is provided is rounded outward.

This maximizes the internal space of the flameless steam reformer 1 and allows the stable movement and heat exchange of the reformed gas.

The reformed gas can move via the second porous plate 214 to the fourth chamber 216d while it can move along the inner circumferential surface of the reforming catalyst housing 210.

For example, the reformed gas can move to the fourth chamber 216d through the holes 214a formed in the edges of the second porous plate 214 and can move along the inner round circumference of the reforming catalyst housing 210, whereby it can easily move toward the reformed gas pipe 30 provided at the central portion of the second porous plate 214.

The flameless steam reformer may further comprise a third porous plate 218 which is provided between the reforming catalyst housing 210 and the combustion catalyst housing 220.

The third porous plate 218 may have holes 218a through which the combustion gas can move.

The third porous plate 218 may be inserted into the outer surface of the reforming catalyst housing 210 or may be fixed by welding to the reforming catalyst housing 210.

The third porous plate 218 may be a given distance from the inner surface of the combustion catalyst housing 220.

This prevents the combustion gas passed through the combustion catalyst 2 from being rapidly discharged from the flameless steam reformer 1 so as to stably maintain its heat exchange with the reforming catalyst 3.

The distance between the third porous plate 218 and the combustion catalyst housing 220 may be any distance that prevents the combustion gas from moving rapidly, but it is not specifically limited.

The combustion catalyst housing 220 will now be described.

The combustion catalyst housing 220 may have such a size that the reforming catalyst housing 210 can be inserted therein.

The combustion catalyst housing 220 may be divided, with respect to the third porous plate 218, into a combustion catalyst region filled with the combustion catalyst 2 and a fifth chamber 226 which is hollow and in which the combustion gas heated by the combustion catalyst 2 moves slowly by diffusion.

The fifth chamber 226 may have a larger area than the first to fifth chambers 216a to 216d.

This is because the use of thermal energy of the combustion gas should be maximized by ensuring sufficient heat exchange with the reformed gas without discharging the high thermal energy of the combustion gas immediately from the flameless steam reformer.

The combustion catalyst housing 220 may further comprise through-holes 222 at the end so as to allow the combustion gas to move to a passage 302.

The holes 222 may be formed spaced apart from the central portion of the combustion catalyst housing 220 and may be spaced apart from each other at constant intervals.

The diameter of the holes 222 is not specifically limited.

Figure 7:
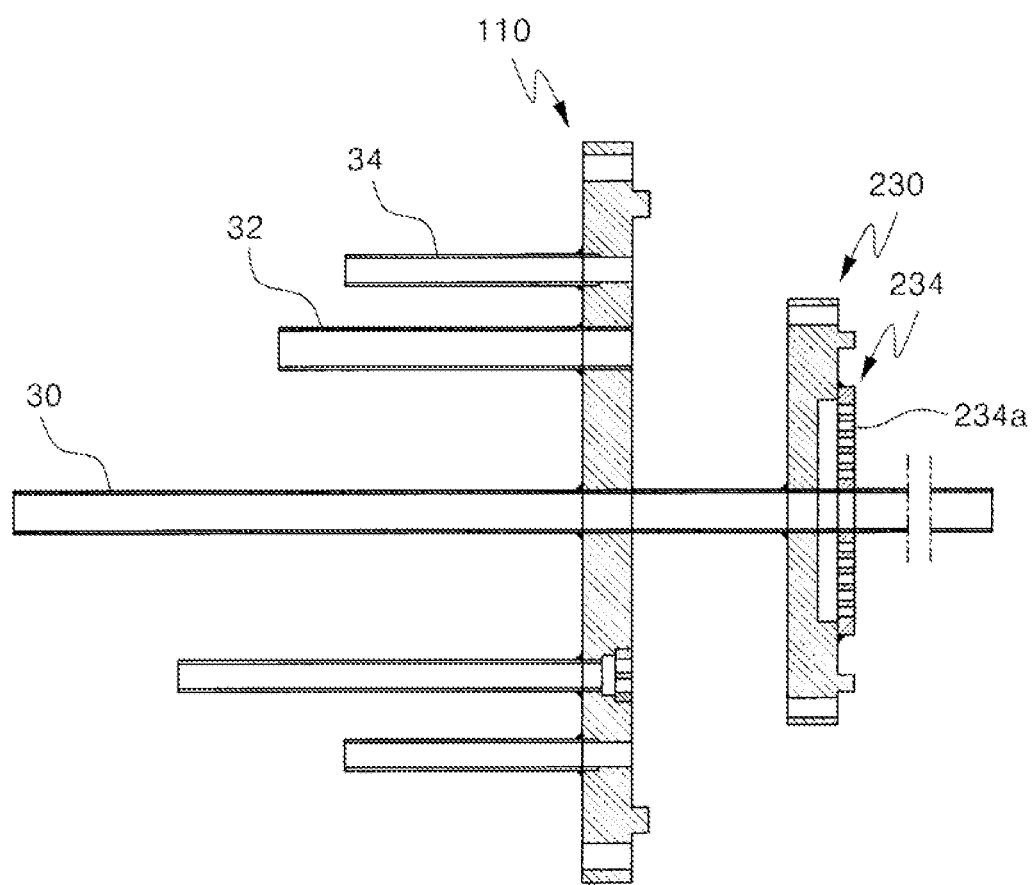
FIG. 7 is a cross-sectional view showing a main housing cover and a first porous plate, which are provided in a flameless steam reformer according to the present invention.

The first porous plate according to the present invention will now be described with reference to FIG. 7.

The first porous plate 234 may include a plurality of holes 234a spaced apart from each other with respect to the central portion, in which the holes 234a can be directed toward the movement direction of the exhaust gas.

The holes 234a can reduce the movement speed of the reforming air to prevent the reforming air from moving rapidly to the reforming catalyst 3, and these holes 234a allow the reforming air to move uniformly to the second chamber 216b.

The plurality of holes 234a may be formed in the upper surface of the first porous plate 234 at constant intervals and may also have the same diameter.

In addition, the reformed gas pipe 30 may be inserted into the central portion of the first porous plate 234.

The second porous plate 214 may also have the same structure as the first porous plate 234.

Figure 8:
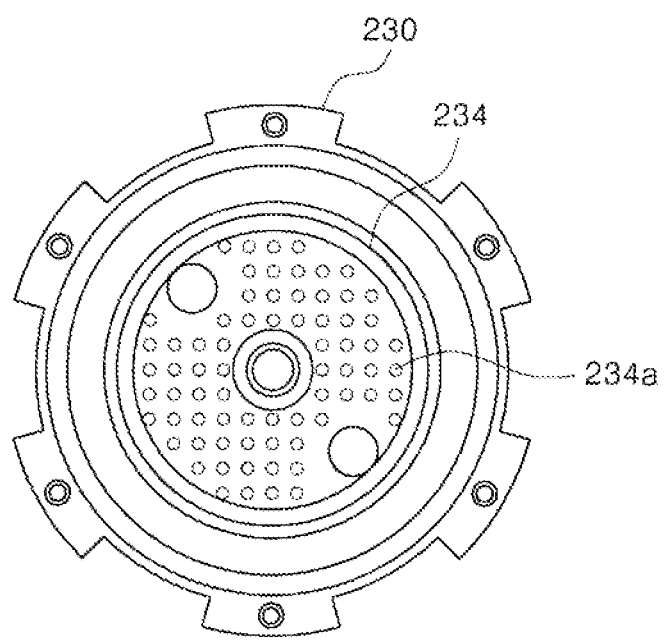
FIG. 8 is a front view showing a first porous plate provided in a flameless steam reformer according to the present invention.

The main housing cover and the catalyst housing cover, which are provided in the flameless steam reformer according to the present invention, will now be described with reference to FIGS. 7 and 8.

The flameless steam reformer 1 may further comprise a main housing cover 110 for covering the catalyst housing 200 and the passage housing 300.

The reformed gas pipe 30 as described above, a reforming air pipe 32 through which the reforming air is supplied, and a combustion fuel pipe 34 through which the combustion fuel is supplied, may be inserted into the main housing cover 110.

The main housing cover 110 may be a kind of pipe manifold.

Also, the catalyst housing cover 230 may be provided around the reformed gas pipe 30 inserted into the center of the main housing cover 110.

The main housing cover 110 may be coupled to both the combustion catalyst housing 220 and the passage housing 300 by a bolt 102.

Figure 9:
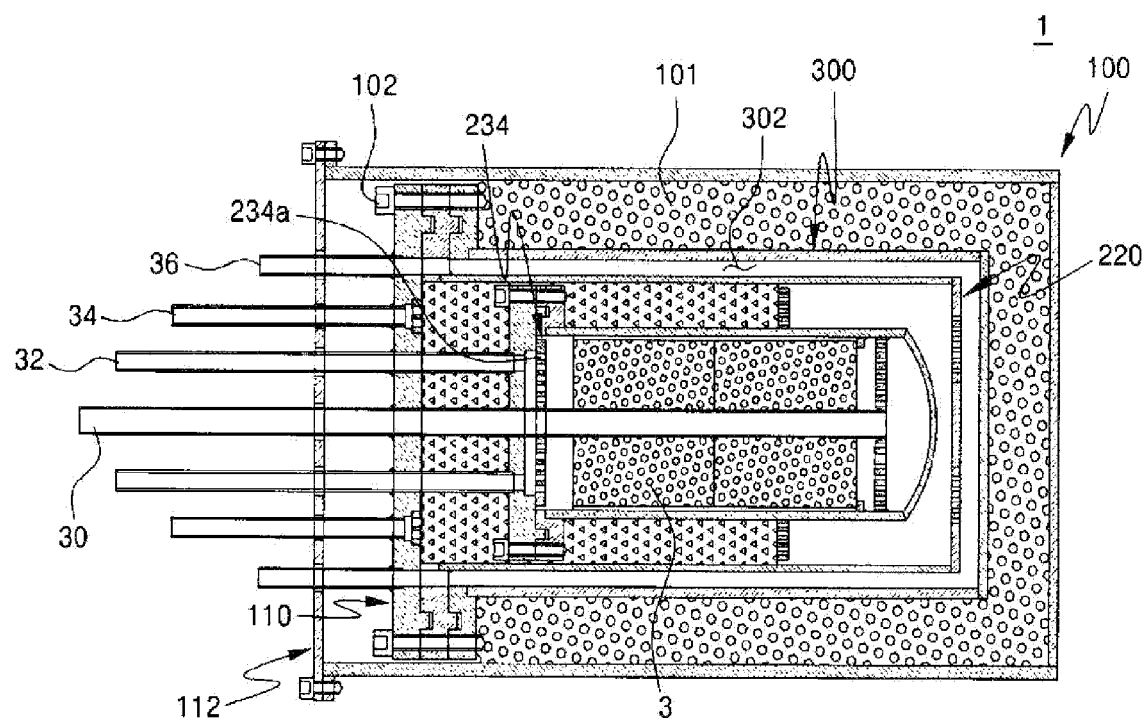
FIG. 9 is a cross-sectional showing a passage housing provided in a flameless steam reformer according to the present invention.

The passage housing according to the present invention will now be described with reference to FIG. 9.

The passage housing 300 may be provided within a main housing 100 to be described later.

The passage housing 300 may be provided closely to the heat-insulating layer 101 provided in the main housing 100.

This minimizes the loss of heat from the nameless steam reformer 1.

The passage housing 300 may include a passage 302 provided along the outer side of the combustion catalyst housing 220.

Through the passage 302, the combustion fuel heat-exchanged with the reforming catalyst 3 can be exhausted.

The passage 302 may be provided along the circumferential direction of the flameless steam reformer 1.

The flameless steam reformer 1 may further comprise an auxiliary housing cover 112 for covering the main housing 100.

The reformed gas pipe 30 as described above, a reforming air pipe 32 through which the reforming air is supplied, a combustion fuel pipe 34 through which the combustion fuel is supplied, and an exhaust gas pipe 36, may be inserted into the main housing cover 110.

The auxiliary housing cover 112 may be provided outside the main housing cover 110.

The state of operation of the inventive flameless steam reformer configured as described above will now be described with reference to FIGS. 10 and 11.

Figure 10:
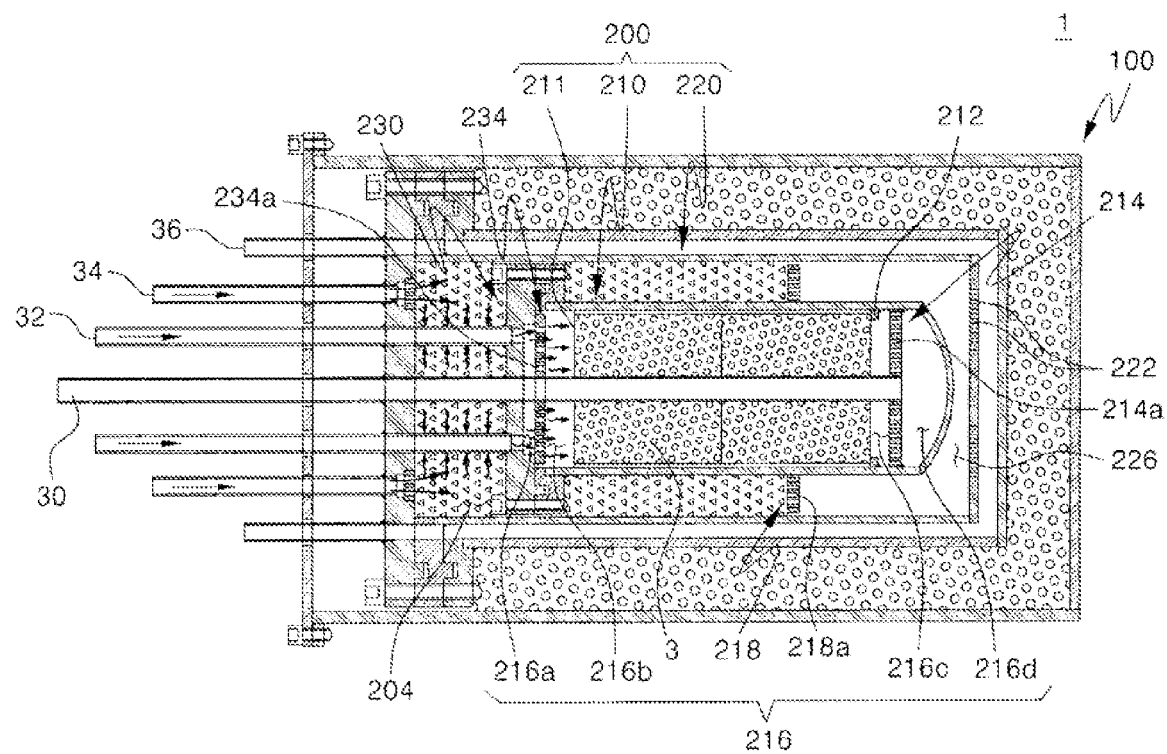
FIGS. 10 and 11 show the state of operation of a reformer according to the present invention.

Referring to FIG. 10, in the flameless steam reformer 1, the combustion fuel is supplied to the combustion fuel pipe 34 and moves to a receiving portion 204 filled with the combustion catalyst 2.

Before the combustion fuel moves to the position of the reforming catalyst 3, it comes into contact with the combustion catalyst 2 while it starts to be heated to a given temperature.

At the same time, the reformed gas air to the position of the catalyst housing cover 230 via the main housing cover 110 provided in the flameless steam reformer 1.

Before the reforming air moves to the reforming catalyst 3, it may receive heat transferred into the reforming air pipe 32 by the combustion catalyst 2, and it may be heated to a given temperature before it moves to the reforming catalyst 3.

Thus, even in a condition in which a separate burner is not provided, the combustion fuel and the reforming air are heated, and particularly, the reaction of the combustion catalyst 2 with the combustion fuel occurs at a relatively low temperature while the local concentration of heat in the flameless steam reformer 1 can be prevented.

The reforming air moves along the reforming air pipe 32 so that it is vaporized into steam which then moves to the first chamber 216a. The reforming air moves through a limited area of the reforming air pipe 32 and then moves to the first chamber 216a while it diffuses.

Because the catalyst housing cover 230 has a plurality of reforming air pipes 32 arranged along the circumferential direction thereof, the reforming air can be introduced uniformly into the internal space of the first chamber 216a.

The reforming air does not move from the first chamber 216a immediately toward to the reforming catalyst 3, but the movement thereof is delayed for a given time while heat generated in the combustion catalyst 2 can be transferred thereto.

The reforming air can move through the holes 234a of the first porous plate 234 to the second chamber 216b.

When the reforming air moves from the first chamber 216a to the second chamber 216b, it passes through the holes 234a while the movement thereof is delayed for a given time, and it is continuously heat-exchanged with the combustion catalyst housing 220 including the combustion catalyst 2.

Because the second chamber 216b has a larger internal space than the first chamber 216a, the reforming air passed through the first porous plate 234 additionally diffuses in the second chamber.

In the second chamber 216b, the combustion catalyst is provided around the reforming catalyst housing 210, and thus the reforming air can be continuously heat-exchanged during the movement thereof to the reforming catalyst 3.

Figure 11:
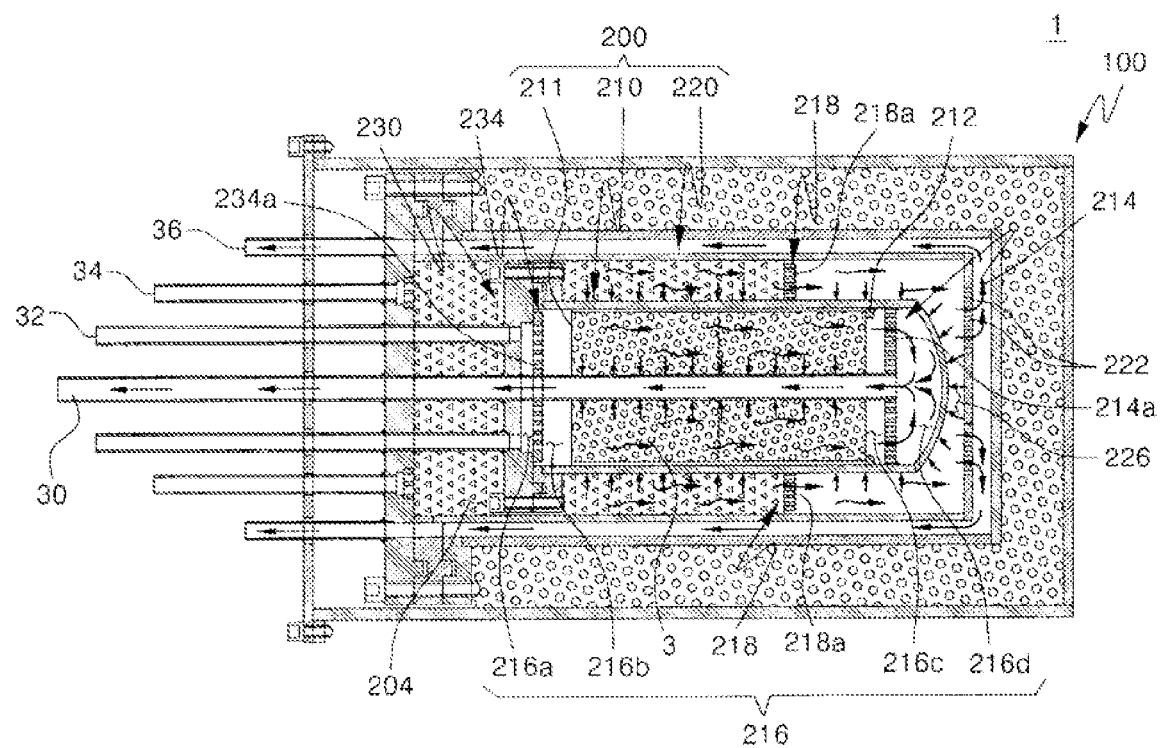

Referring to FIG. 11, the reforming air comes into contact with the reforming catalyst 3 while it moves along the lengthwise direction of the reforming catalyst housing 210. At the same time, the combustion fuel moves along the lengthwise direction of the combustion catalyst housing 220 while the heat of the combustion catalyst 2 is transferred to the combustion fuel.

The reforming air moves along the reforming catalyst housing 210 to the third chamber 216c.

The third chamber 216c prevents the reformed gas from moving rapidly to the reformed gas pipe 30, like the first chamber 216a as described above, and it allows the reformed gas to diffuse in the third chamber 216c for a given time. The reformed gas moves through the holes 214a of the second porous plate 214 to the fourth chamber 216d.

The movement of the combustion fuel is delayed by the third porous plate 218 for a given time, and the combustion fuel moves slowly through the holes 218a to the fifth chamber 226.

When the movement of the combustion fuel is delayed, high-temperature heat can be transferred to the reforming catalyst housing 210.

The reforming air moves to the fourth chamber 216d while it is reformed into hydrogen gas at a given temperature, and it can move along the inner round shape of the reforming catalyst housing 210 to the reformed gas pipe 30.

The combustion fuel moves through the holes 222, and it moves along the passage 302 and is exhausted through the exhaust gas pipe 36.

The reformed gas moves along the reformed gas pipe 30 and it passes through the reforming catalyst housing 210, the second chamber 216b and the first chamber 216a while it can additionally be heat-exchanged with the combustion catalyst 2.

In the flameless steam reformer 1 according to the present invention, when the combustion catalyst 2 and the reforming catalyst 3 are to be replaced, the bolt 102 coupled to the auxiliary housing cover 112 and the main housing cover 110 will be disengaged and the combustion catalyst 2 and the reforming catalyst 3 will be replaced.

Thus, the catalysts can be replaced by simply disengaging the bolt 102.

As described above, the flameless steam reformer according to the present invention uses a flameless method which improves the durability of the reformer.

Also, the flameless steam reformer according to the present invention has a compact structure and, at the same time, can reform good-quality hydrogen and cause heat transfer.

In addition, the flameless steam reformer according to the present invention can reform hydrogen even at low temperature.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A flameless steam reformer comprising:
   a main housing;
   a catalyst housing which is inserted to the main housing and in which a combustion catalyst and a reforming catalyst are provided such that they are partitioned from each other; and
   a passage housing which is disposed between the main housing and the catalyst housing and includes a passage through which combustion fuel supplied to the catalyst housing moves, the passage being a space between an outer surface of the catalyst housing and an inner surface of the passage housing and leading to an exhaust gas pipe,
   wherein the catalyst housing includes:
   a reforming catalyst housing including the reforming catalyst; and
   a combustion catalyst housing in which the reforming catalyst housing is inserted and the combustion catalyst is included, and
   wherein the combustion catalyst is positioned at least in part between a main housing cover and the reforming catalyst housing, such that the combustion catalyst is provided ahead and around the reforming catalyst housing.

2. The flameless steam reformer of claim 1, wherein the reforming catalyst housing includes an inner housing in which the reforming catalyst is received.

3. The flameless steam reformer of claim 2, wherein the inner housing is disposed along the lengthwise direction of the reforming catalyst housing so as to be spaced inward from both ends of the reforming catalyst housing.

4. The flameless steam reformer of claim 2, wherein the reforming catalyst housing comprises a stopper for fixing the position of the inner housing.

5. The flameless steam reformer of claim 1, wherein a reformed gas pipe through which the reformed gas moves is provided in the center of the inside of the reforming catalyst housing.

6. The flameless steam reformer of claim 1, wherein the reforming catalyst housing includes at least one chamber disposed along the lengthwise direction thereof.

7. The flameless steam reformer of claim 6, wherein the chamber comprises first and second chambers in the front end thereof.

8. The flameless steam reformer of claim 6, wherein the chamber comprises third and fourth chambers in the rear end thereof.

9. The nameless steam reformer of claim 7, wherein a first porous plate dividing the inner region of the chamber and having a plurality of holes is disposed between the first and second chambers.

10. The flameless steam reformer of claim 8, wherein a second porous plate dividing the inner region of the chamber and having a plurality of holes is disposed between the third and fourth chambers.

11. The flameless steam reformer of claim 10, wherein the second porous plate has a plurality of holes which have the same diameter and spaced apart from each other at constant intervals.

12. The flameless steam reformer of claim 7, wherein the second chamber is larger than the first chamber.

13. The flameless steam reformer of claim 8, wherein the fourth chamber is larger than the third chamber.

14. The flameless steam reformer of claim 9, wherein a reformed gas pipe through which the reformed gas moves is inserted in the center of the first porous plate.

15. The flameless steam reformer of claim 9, wherein the first porous plate has a plurality of holes which have the same diameter and spaced apart from each other at constant intervals.

16. The flameless steam reformer of claim 9, wherein the first porous plate is disposed at the central portion of the catalyst housing cover.

17. The flameless steam reformer of claim 9, wherein the combustion catalyst housing includes holes through which the combustion gas passed through a third porous plate moves.

18. The flameless steam reformer of claim 1, wherein the end of the reforming catalyst housing is rounded outward toward the passage housing.

19. The flameless steam reformer of claim 1, wherein the catalyst housing comprises a catalyst housing cover in which pipes for moving the reformed gas, the reforming air and the combustion gas are inserted.

20. The flameless steam reformer of claim 19, wherein the catalyst housing cover comprises a protrusion toward the catalyst housing, in which the catalyst housing comprises a groove in which the protrusion is inserted.

21. The flameless steam reformer of claim 19, wherein a first porous plate is disposed at the central portion of the catalyst housing cover.

22. The flameless steam reformer of claim 1, wherein the combustion catalyst housing comprises a receiving portion in which the combustion catalyst is filled.

23. The flameless steam reformer of claim 1, wherein the reforming catalyst housing comprises a third porous plate which is provided on the outside thereof and has holes through which the combustion gas from the combustion catalyst housing move.

24. The flameless steam reformer of claim 23, wherein the inner region of the combustion catalyst housing is divided, with respect to the third porous plate, into two.

25. The flameless steam reformer of claim 23, wherein the combustion catalyst housing includes a fifth chamber in which the combustion gas passed through the third porous plate diffuses and from which heat is transferred to the reforming catalyst housing.

26. The flameless steam reformer of claim 1, wherein the main housing cover is provided to cover the main housing and the passage housing.

27. The nameless steam reformer of claim 1, wherein the main housing comprises an auxiliary housing cover provided on the outside thereof.

28. The nameless steam reformer of claim 1, wherein the main housing includes a heat-insulating layer.

29. The flameless steam reformer of claim 1, wherein the passage is provided along the circumferential direction of the passage housing.

* * * * *